Dec. 23, 1969   H. W. MORRIS   3,485,555
AUXILIARY REARVIEW MIRROR SYSTEM FOR VEHICLES
Filed Jan. 26, 1968
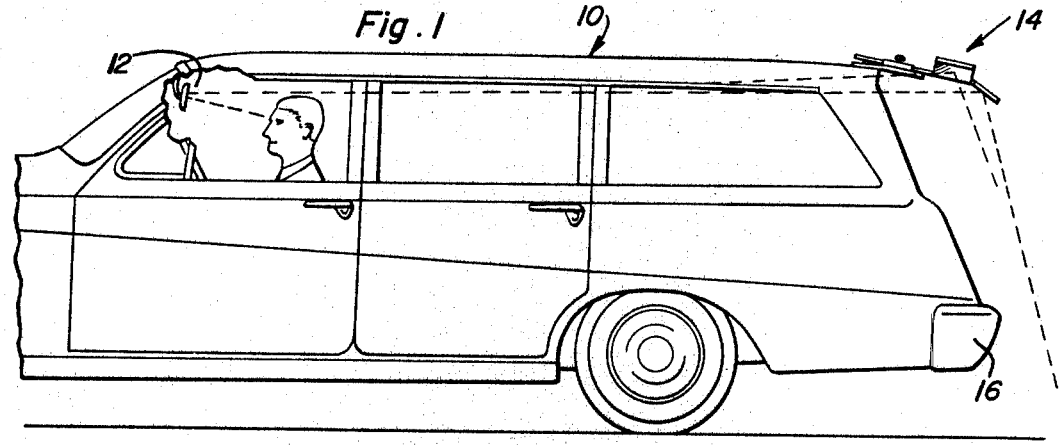
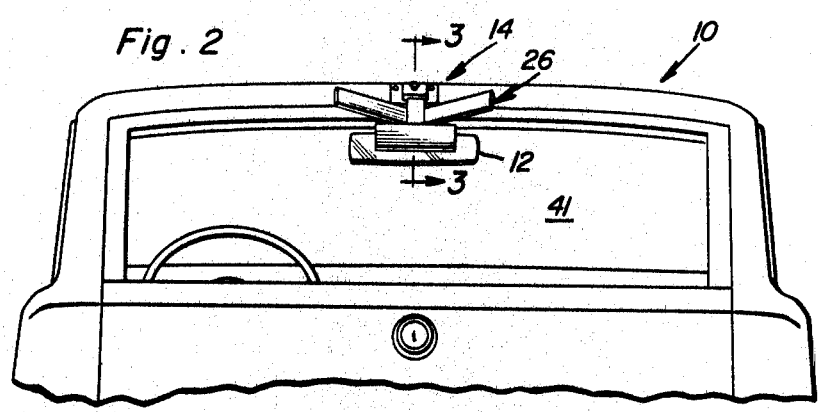
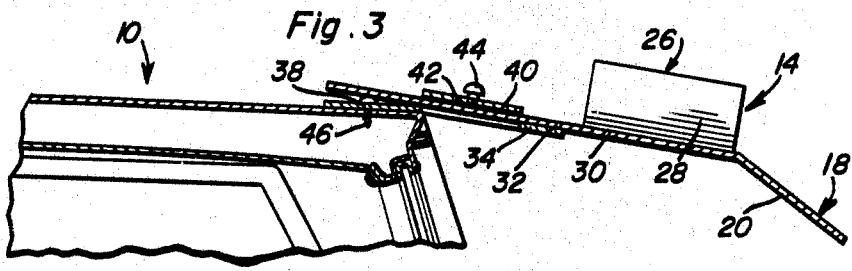
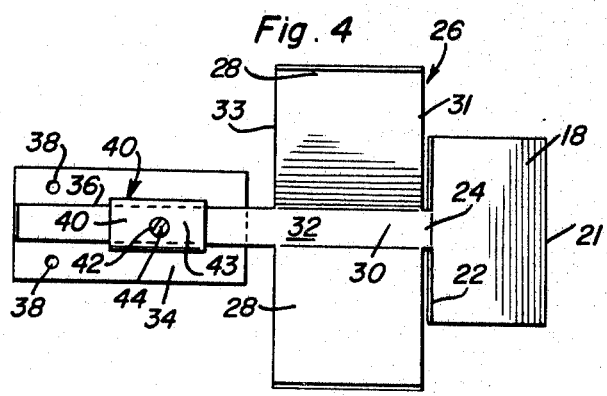
Harold W. Morris
INVENTOR.

United States Patent Office 3,485,555
Patented Dec. 23, 1969

3,485,555
AUXILIARY REARVIEW MIRROR SYSTEM FOR VEHICLES
Harold W. Morris, 11445 SW. 94th St., Tigard, Oreg. 97223
Filed Jan. 26, 1968, Ser. No. 700,868
Int. Cl. G02f 1/00
U.S. Cl. 350—302                    1 Claim

ABSTRACT OF THE DISCLOSURE

A mirror assembly mounted upon the rear of a vehicle and including an elongated slide received within a separate mounted track in which the slide may be adjustably positioned for cooperation with the usual rear view mirror to provide views adjacent the lower and lateral rear zones of the vehicle. The free outward end of the slide mounts a downwardly inclined reflective surface while the intermediate portion of the sliding member mounts two upwardly diverging reflective plate members including reflective surfaces on the lower sides thereof.

---

The present invention relates to the field of mirrors and more specifically to vehicle rearview mirror assemblies.

The prior art has long recognized the need for a rear view reflector which would enable an automobile driver to detect obstacles located behind the rear end of his vehicle not visible through a conventional rearview mirror. Certain prior constructions consist of a single planar mirror disposed within the rear window area angled to allow a driver to observe rearward obstacles by glancing in his forwardly located rearview mirror. However, insofar as such an apparatus utilizes a single planar mirror, extended lateral coverage is not satisfactory. Further, such constructions are not suitably adjustable to permit the outward displacement of the mirror assembly beyond the obstructing rearmost portion of the vehicle body. This results in a limitation upon the angle at which the mirror assembly may be positioned. Certain other prior art devices employ a curved reflecting surface which affords a wider viewing angle. However, as will be appreciated, the curved reflecting surface causes distortion of the reflected images and makes it difficult for a driver to ascertain true distances between objects.

In summary, the present invention includes an adjustably slidable member mounted on or above a vehicle rear window upon which a mirror assembly is fixed. Images reflected from the mirror assembly are in turn reflected from the conventional forwardly located rearview mirror. The invention permits the outward sliding of the mirror assembly to a point extending over the rearmost portion of the vehicle body thus affording the driver a greater flexibility in adjusting the mirror assembly without encountering an obstructing portion of the vehicle. The mirror assembly itself includes a reflecting member which is downwardly inclined for viewing conditions immediately rearward of his automobile. Further, a V-shaped mirror structure is fixedly mounted on the sliding member for viewing laterally disposed rearward areas. Thus, the present invention employs three planar reflecting surfaces which reflect discrete viewing zones including left and right lateral zones and a zone intermediate thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view illustrating the mounting of the present mirror assembly on the rear of an automotive vehicle.

FIGURE 2 is a partial rear elevational view.

FIGURE 3 is a partial side view of the present mirror assembly taken along a plane passing through section line 3—3 of FIGURE 2.

FIGURE 4 is a top plan view of the present mirror assembly.

Referring specifically to the drawings, reference numeral 10 denotes an automobile on which the present invention is mounted. The forward portion of the automobile includes a conventional rear view mirror 12. The rear of the automobile includes the auxiliary mirror assembly denoted by 14. The assembly is positioned in a manner permitting the viewing thereof through the conventional rearview mirror 12. Further, the mirror assembly 14 is disposed in a manner permitting the viewing of an area rearwardly and laterally of the rear bumper 16 of the automobile 10. FIGURE 2 illustrates the longitudinal alignment of the forwardly located conventional rearview mirror and the present mirror assembly 14.

As will be noted by inspecting FIGURES 3 and 4 of the drawings, the mirror assembly 14 is principally divided into three sections. The first section includes a rectangular plate member 18 transversely disposed with respect to the length of automobile 10. The plate member is normally positioned at a downward incline with the reflecting surface 20 thereof on the underside of the plate member. The reflector plate member 18 as well as the other reflector plate members described hereinafter are fabricated from a flexible sheet metal with one surface being suitably finished or coated to present a reflecting surface. Alternately, the material utilized may be plastic upon which a reflecting surface is electrodeposited. Plate member 18 includes a first transverse edge 21 thereof disposed parallel with the rear side of the automobile 10. A second transverse edge 22 is defined parallel to the first edge 21 in spaced relation thereto.

Attention is directed to FIGURES 2 and 4 which illustrate a V-shaped mirror structure generally denoted by reference numeral 26 fabricated in a manner previously described. This latter mentioned mirror structure is integrally connected with an integral tabular portion 24 which in turn is integrally connected with the aforementioned plate member 18. The V-shaped mirror structure 26 includes two rectangular reflecting plates 28 each including a reflecting surface on the underside thereof. The plate members 28 diverge upwardly from a rectangular strip or base 30 which is integrally connected with the shoulder tab 24. The aforementioned V-shaped structure 26 includes an outer transverse edge 31 parallel with the rear side of the automobile 10 and parallel in turn with the first and second transverse edges 21 and 22 respectively of the plate member 18. An inner transverse edge 33 parallel to the outer transverse edge 31 is also defined as part of the V-shaped structure 26. A rectangular guide member 32 appends outwardly from and integral with the inner transverse edge 33 of the V-shaped structure 26. This latter mentioned guide member 32 is equal in width to the base 30 of the structure 26 and is integrally connected thereto. It is to be noted that the plate members 18, and 28 as well as the base 30 and guide member 32 may be formed from a stamped and flexible metal sheet or plastic material treated in a manner as aforementioned. To obtain the proper angular disposition of the three plate members, each may be bent a sufficient amount to effectuate a desired viewing angle when viewed from the conventional forwardly located rearview mirror 12.

As further seen in FIGURES 3 and 4 of the drawing, a separate rectangular bracket 34 is provided with a track 36 centrally and longitudinally disposed therealong.

An outwardly end portion of the bracket 34 includes apertures 38 formed therein for attachment of the bracket to a suitable body portion of the vehicle 10 above the rear window 41. Alternatively, it is within the purview of the present invention to provide a suction cup mounted on the underside of the bracket 34 for attachment of the present mirror assembly to the rear window 41.

A generally U-shaped sleeve portion 40 of the bracket 34 is stamped from the body of the bracket 34. The bight portion 43 of the sleeve portion remains parallel to the surface of the bracket 34. The central portion of the sleeve 40 includes a threaded aperture 42 formed therein to receive a setscrew 44 shown in FIGURE 3. Thus, it will be appreciated that the rectangular guide member 32 is adjustatbly slidable within the track 36 and may be secured therein by properly fastening the setscrew 44. As seen in FIGURE 3, the mounting bracket 34 is fastened to the top of the vehicle 10 by means of a suitable fastener 46 inserted through the apertures 38 in the bracket 34.

In operation of the present device, the mirror assembly 14 is positioned in a rearwardly extending manner as illustrated in FIGURE 1. Each of the three reflector plate members may be bent until a satisfactory viewing area is obtained when the aforementioned reflective surfaces are viewed through the forward rearview mirror 12. In order to adjust the present mirror assembly 14 in a manner obviating obstruction of the rear portion of the vehicle 10, the guide 32 is positioned within the track 36 until the various reflective surfaces extend rearwardly of any obstructions. The setscrew 44 is then fastened thereby securing the guide 32 in the track 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A mirror assembly mounted to a vehicle for alerting a driver of surrounding conditions comprising an integrally formed mirror component, said component being fabricated from a flexibly settable base material, and having a coating of reflective material deposited thereon having an elongated base portion including lateral and transverse edges, wherein the mirror assembly is to be attached to the rear of a vehicle having a rear view mirror, the assembly being in optical alignment with the rear view mirror to enable reflective viewing of the fields of view through the rear view mirror a mounting member attached to the vehicle for supporting the component, the base portion being disposed in contacting relation wih the plate, adjustable means for clamping the base portion to the mounting member, a first mirrored wing portion angularly extending from a first lateral edge of the base portion for reflecting a first field of view, a second mirrored wing potrion angularly extending from the second lateral edge of the base portion for reflecting a second field of view and a third mirrored wing portion angularly extending from a second transverse edge of the base portion for reflecting a third field of view, the wing portions being bendably adjustable with respect to the base portion to assume preselected angular positions.

References Cited
UNITED STATES PATENTS

| 1,444,538 | 2/1923 | Crooks | 350—302 |
| 1,918,802 | 7/1933 | Fleischer | 350—302 |
| 1,925,666 | 9/1933 | Kerns | 350—303 |
| 1,986,033 | 1/1935 | Trufant | 350—302 |
| 2,075,900 | 4/1937 | Jackson | 350—302 |
| 2,257,510 | 9/1941 | Mote | 350—302 |

FOREIGN PATENTS 736,382    9/1955    Great Britain.

DAVID SCHONBERG, Primary Examiner

M. J. TOKAR, Assistant Examiner

U.S. Cl. X.R.

350—301